INVENTOR.
CECIL H. WILLIS
BY Morris L. Rabkin
ATTORNEY

May 19, 1959 C. H. WILLIS 2,887,078

AUTOMATIC SOLDERING APPARATUS

Filed Feb. 8, 1955 4 Sheets-Sheet 2

INVENTOR.
CECIL H. WILLIS
BY Morris L. Rabkin
ATTORNEY

May 19, 1959 C. H. WILLIS 2,887,078

AUTOMATIC SOLDERING APPARATUS

Filed Feb. 8, 1955 4 Sheets-Sheet 3

INVENTOR.
CECIL H. WILLIS
BY Morris Rabkin
ATTORNEY

INVENTOR.
CECIL H. WILLIS
BY Morris B. Rabkin
ATTORNEY

United States Patent Office
2,887,078
Patented May 19, 1959

2,887,078

AUTOMATIC SOLDERING APPARATUS

Cecil H. Willis, Gibbsboro, N.J., assignor to Radio Corporation of America, a corporation of Delaware Application February 8, 1955, Serial No. 486,844

14 Claims. (Cl. 113—59)

This invention relates to solder applying apparatus, and more particularly to an improved apparatus for automatically applying solder to a sheet having exposed metal on one surface thereof.

This apparatus is especially adaptable to the soldering of printed circuits, one common type of which comprises a sheet of electrically insulating material, such as a phenolic board, carrying on one surface thereof one or more electrical conductors in the form of thin, flat stripes or strips integrally united to the insulating material.

Where it is desired to mount a number of circuit components on one side of a sheet of insulating material and connect them at many points, by means of leads extending through apertures in the sheet, to the printed conductors on the other side, there is a considerable problem in making the connections rapidly and efficiently. In a typical assembly, over one hundred connections may be involved and to make each one of these connections individually with a soldering iron is a tedious process. Consequently, it is desirable to be able to use a process which will enable an operator to solder all of the connections in the same operation or operations. One method of soldering all such connections simultaneously is a dip-soldering technique. In this type of process, the entire side of the assembly containing the printed conductors with the leads from the circuit components projecting through the various points can be dipped face down in a bath of molten solder and removed after a period of immersion. This results in coating the conductors with solder and soldering all of the connections at the same time. However, it has been found, that when the conductors are closely spaced, some of the solder frequently bridges across the closely-spaced conductors in places where it is not wanted and therefore causes "shorts."

This invention relates to an improved apparatus for soldering an assembly, such as above described, in such a manner as to eliminate some of the disadvantages of the dip-soldering method.

An object of the present invention is to provide an improved apparatus to accomplish the soldering or tinning of a sheet having an exposed metal surface.

Another object of this invention is to provide an improved apparatus for accomplishing the soldering of a large number of conventional circuit components to a board having conductive strips integrally united thereto.

A further object of this invention is to provide an improved apparatus for automatically accomplishing the steps of fluxing, soldering and cleaning the exposed metal surface of a sheet of material.

A still further object of this invention is to provide an improved soldering apparatus which is readily adaptable to automatic manufacturing techniques.

Apparatus in accordance with the present invention for accomplishing these and other objects includes a rotary support member or carrier for carrying a number of sheets on its peripheral surface. This member is provided with clamps by means of which the sheets are readily attached to and removed from the surface of the rotary carrier.

The sheets, when attached to the rotary carrier, are curved to correspond to the curvature of the carrier and are mounted so that the exposed metal surface faces outwardly with respect to the carrier.

A plurality of roller assemblies are mounted to be engaged by the peripheral surface of a rotary carrier and have their axes of rotation parallel to the axis of rotation of the carrier. One of these rollers has a resilient absorbent surface adapted to present a liquid flux to the surface of the rotary carrier. A second of these rollers is provided with a metal impregnated surface adapted to present molten metal to the surface of the rotary carrier. A third roller is provided with an absorbent abrasive surface adapted to present a cleaning solvent to the surface of the rotary member.

The novel features of the invention, as well as additional objects and advantages thereof, will be understood more fully from the following description when read in connection with the accompanying drawings, in which.

Figure 1:
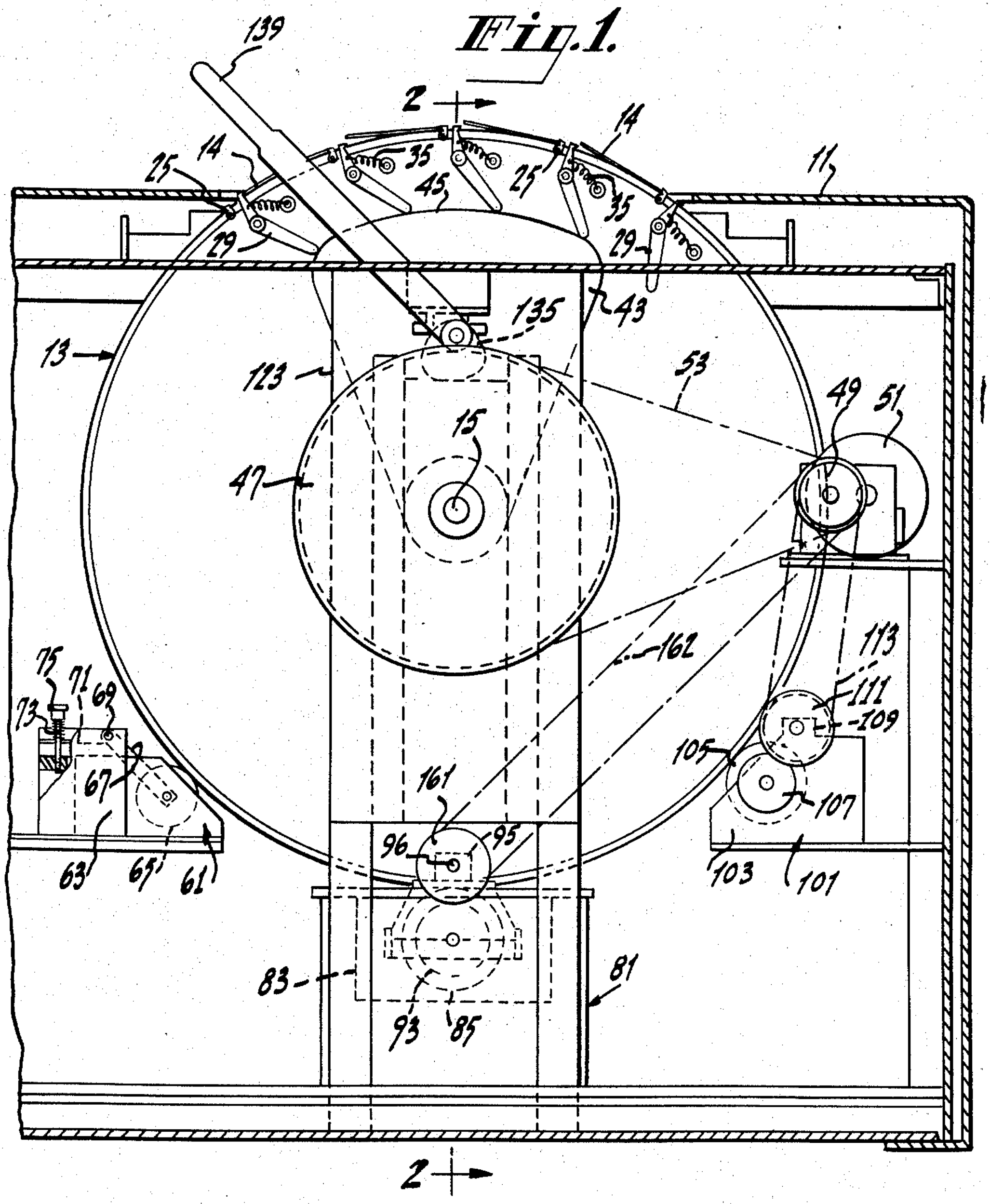
Figure 1 is a front elevational view of an apparatus in accordance with the present invention in which the housing is broken away.

Referring in more detail to the accompanying drawings, the present invention is set forth herein illustratively as an apparatus for the soldering of printed circuit boards. These printed circuit boards may be comprised of a phenolic board having conductive strips integrally united to it on one surface. Circuit components are mounted on the opposite surface and are secured thereto by means of their terminal leads which extend through apertures in the board and are bent over on the opposite side to engage the conductive strips. The apparatus includes a housing or enclosure 11 having essentially rectangular dimensions. A rotary carrier 13 for carrying the printed circuits occupies essentially one half of the housing volume. This rotary carrier is mounted on a horizontal shaft 15 and a portion of the carrier extends out of the top of the housing 11 so that the circuit boards 14 may be attached to and removed from the rotary member.

The shaft 15 extends completely across the housing 11 from front to rear and is rotatably supported in a sleeve 17 which encloses most of the rearward half of the shaft 15. Details of the supporting structure for the sleeve 17 will be described subsequently. The rotary member 13 comprises two identical portions which are carried on the shaft 15 facing each other. Since these portions are identical, the following description will be confined to one half of this structure, the other half being identified by similar reference numerals. A hub 19 is mounted on the shaft 15 in a manner such that it is movable axially along the shaft and may be rigidly locked thereto in various positions along the shaft. A disc 21 is rigidly attached to the hub 19 so that it is rotated by the shaft 15 through the hub. When a circuit board 14 is placed on the rotary member 13, the surface of the board having the circuit components mounted thereon will engage the edge surface of the disc 21.

Figure 3:
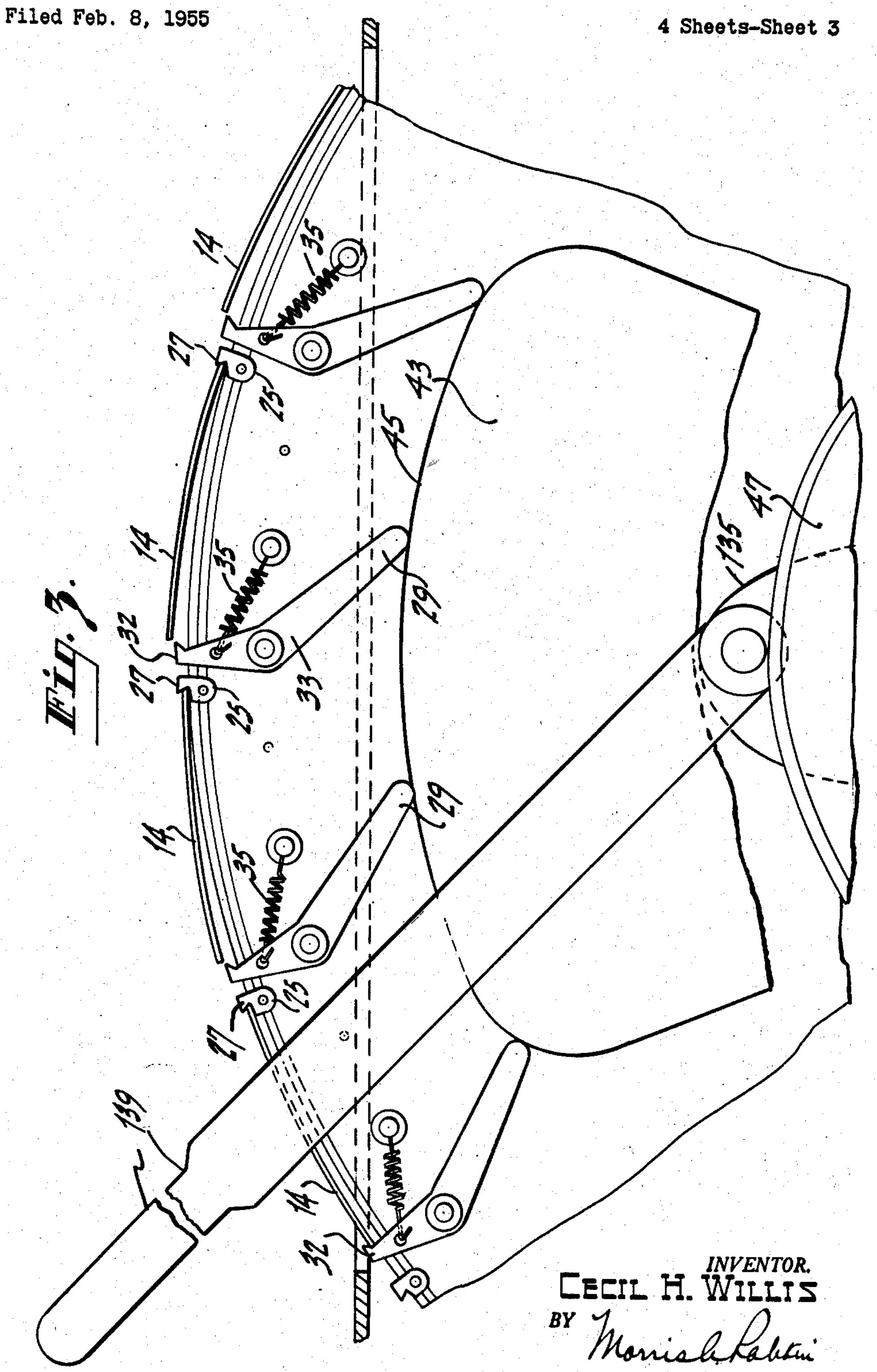
Figure 3 is a detail view of a portion of the rotary carrier illustrating the clamping means.

Referring now to Figures 1 and 3, a pair of clamps are provided to hold each end of each circuit board 14 against the disc. One of these clamps is a fixed clamp 25, a plurality of which are mounted at spaced points around the periphery of the disc 21 to engage a corresponding end of each of successive circuit boards which are placed on the rotary member. Each of these clamps 25 comprises a member which is attached adjacent the edge of the disc 21 and has a portion which extends radially outwardly from the edge of the disc. This last mentioned portion has an overhanging lip 27 which engages the outer surface of a circuit board 14 and retains it in engagement with the disc. The other of these clamps is a movable clamp 29 which comprises a rocker arm having a pivot point intermediate its ends 31 and 33. A plurality of these arms are pivotally mounted adjacent the edge of the disc 21 and are spaced around the disc to engage corresponding ends of adjacent circuit boards placed thereon. The outer end 31 of the rocker arm extends outwardly beyond the edge of the disc 21 and also includes an overhanging lip 32 which is adapted to engage the outer surface of a circuit board 14. The inner end 33 of the rocker arm extends generally toward the axis of rotation of the disc and is disposed to be engaged by a cam to be described. A tension spring 35 is connected between the outer end 31 of the movable clamp and a fixed point on the disc 21. This spring tends to draw the outer end 31 of the clamp toward its respective fixed clamp mate 25 so that a circuit board placed on the rotary member will normally be securely held between these clamps.

Figures 2, 5:
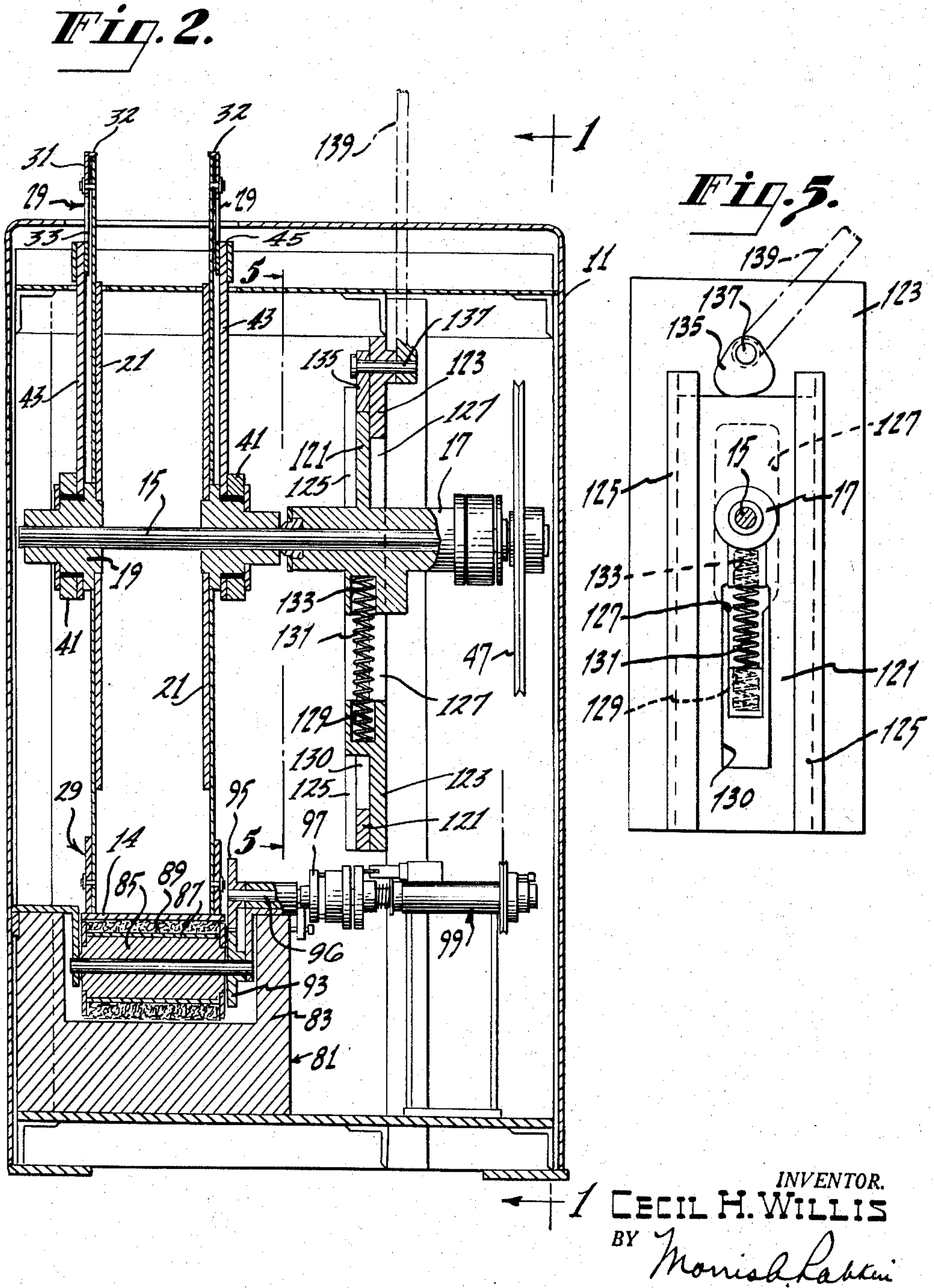
Figure 2 is a sectional elevational view taken along the line 2—2 of Figure 1 and looking in the direction of the appended arrows.
Figure 5 is an elevational view taken along the line 5—5 of Figure 2 in the direction of the appended arrows illustrating the supporting means for the rotary carrier.

Referring now to Figure 2 a collar 41 is rotatably mounted on the hub 19. A cam 43 is rigidly fixed to the collar 41 and extends upwardly from the collar to an area adjacent the edge of the disc 21. This cam is supported in an upright position in a manner such that the cam will be permitted to move in a vertical direction but will be restrained from rotating about the shaft 15. The necessity for the vertical movement will become apparent. The cam 43 has the general configuration of a circular segment which is attached to the collar 41 at its apex. The curved portion of the cam is concentric with the edge of the disc 21 and is provided with a cam surface 45 which is engaged by the inner ends 33 of the movable clamps 29. When the inner end of a clamp 29 engages this cam surface 45 the clamp is pivoted so that its outer end is drawn away from its mating fixed clamp 21 against the pressure of the spring 35 thereby releasing a circuit board which may be clamped between these clamps and permitting another board to be inserted. A pulley 47 is fixed to the end of the shaft 15 opposite from the rotary member 13. A pulley 49 connected to the shaft of a motor 51 is coupled to the pulley 47 by a belt 53 to provide a drive source for the shaft 15.

A fluxing assembly 61 is mounted within the housing and comprises a tank 63 and a roller 65. The roller is disposed within the tank with its axis of rotation parallel to the axis of rotation of the rotary carrier 13 and is provided with a resilient absorbent surface. The roller is so disposed in the tank that a portion thereof is submerged in a liquid flux contained in the tank 63 and a portion of its exposed surface extends through an opening in the tank and engages the circuit boards carried by the rotary carrier 13. The roller 65 is supported by a pair of arms 67 rigidly attached to a rotatably mounted shaft 69. A third arm 71 is also rigidly attached to the shaft 69 and extends from the shaft so that the complete assembly of the arms 67 and 71 and the shaft 69 form an integral pivotally mounted assembly acting as a bell crank. A coil spring 73 exerts a biasing force on the arm 71 which, through the bell crank assembly, urges the roller 65 against the rotary member 13. An adjusting screw 75 provides means for adjusting the pressure between the roller 65 and the rotary member 13.

A soldering assembly 81 comprises a tank 83 containing molten solder disposed beneath the rotary carrier 13 and a roller 85 rotatably mounted within the tank 83 and having its axis of rotation parallel to the axis of rotation of the rotary carrier 13. A plurality of longitudinal troughs 87 (see Figure 4) are disposed adjacent each other around the cylindrical surface of the roller 85. The outer layer composed of a knitted steel wire mesh 89 is placed over the troughs 87 and a portion of the wire mesh is disposed within the troughs 87 and is held therein by means of rods 91 which extend within the troughs across the length of the roller 85. The wire mesh 89 provides a relatively smooth continuous surface around the roller 85 which is somewhat resilient and which will become impregnated with molten solder. The roller 85 is submerged in the solder so that only a small portion of the surface of the roller will extend above the solder level. The exposed portion of the roller 85 is disposed to be engaged by the rotary carrier 13 carrying the printed circuit boards. The troughs 87 provide pockets which trap the solder and carry it over the top of the roller to aid in maintaining the molten solder at the surface of the wire mesh which is in engagement with the surface of a circuit board carried on the rotary carrier 13. The driving mechanism for the roller 83 includes a gear 93 mounted on the roller and a gear 95 meshing therewith. The gear 95 is carried on a shaft 96 which also carries a disc like coupling member 97. This member 97 is provided with a pair of crank pins 98 which engage a drive control mechanism 99 to be described.

A cleaning assembly 101 is mounted adjacent the rotary carrier 13 on the side of the carrier opposite the fluxing assembly 61. This unit comprises a tank 103 which contains a suitable solvent for cleaning the soldered surface of the circuit boards and a rotary brush 105 mounted within the tank. This brush 105 is disposed to be partially submerged in the cleaning solvent and to engage the surface of the circuit boards 14 carried by the rotary carrier 13. A gear 107 is attached to the brush 105 and meshes with a gear 109 which is mounted on a shaft with a pulley 111. The pulley 111 is coupled to the motor pulley 49 by a belt 113 to provide the drive for the cleaning assembly.

Referring to Figure 5 the supporting structure for the sleeve 17 will now be described. The sleeve 17 is rigidly secured to a slide member 121. This slide member 121 may be a metallic panel having at least two parallel edges and having an aperture through which the sleeve 17 extends so that its axis is perpendicular to the plane of the slide member. The sleeve 17 is rigidly fixed in this aperture by means of welding for example. A supporting panel 123 is rigidly fixed with respect to the machine housing 11. A pair of L-shaped channels 125 are mounted on the support panel 123 to form a vertical track for the slide member 121. The support panel 123 is provided with an aperture 127 permitting the sleeve 27 to extend therethrough and permitting vertical movement of the sleeve relative to the support panel 123. A bearing member 129 for a helical compression spring 131 is mounted at the lower end of this aperture 127 and is centered in the plane of movement of the slide member 121. An aperture 130 is provided in the slide member 121 to accommodate the bearing member 129 and to permit the slide member 121 to move relative to the bearing member 129. This bearing member 129 provides a seat for the helical compression spring 131 which extends upwardly from this seat in a vertical direction. A similar bearing member 133 is fixed to the under surface of the sleeve 17 in the plane of the slide member 121. This provides the upper bearing surface for the helical compression spring 131. The compression spring 131 biases the slide member 121, and everything supported by the slide member 121, against an upper stop which will now be described.

A cam 135 is mounted at the upper portion of the support panel 123 above the upper edge surface of the slide member 121. This cam is rigidly attached to a shaft 137 which is rotatably mounted in the support panel 123. The cam comprises an eccentrically mounted disc whose edge surface engages the upper edge surface of the slide member 121. A handle 139 is also rigidly fixed to the cam shaft 137 and serves to rotate the cam 135. It will be apparent now that the slide member 121 is continuously urged upwardly against the cam 135 and that the sleeve assembly 17 and hence the complete assembly on which the circuit boards are carried may be positioned in either an upper or lower position by actuating the handle 139. When this assembly is in the upper position the rotary carrier 13 will not engage any of the fluxing 61, soldering 81 or cleaning 101 assemblies above described. When the assembly is in the lower position these assemblies will be engaged by and act on the circuit boards which are attached to the rotary carrier 13.

Figures 4, 6, 7:
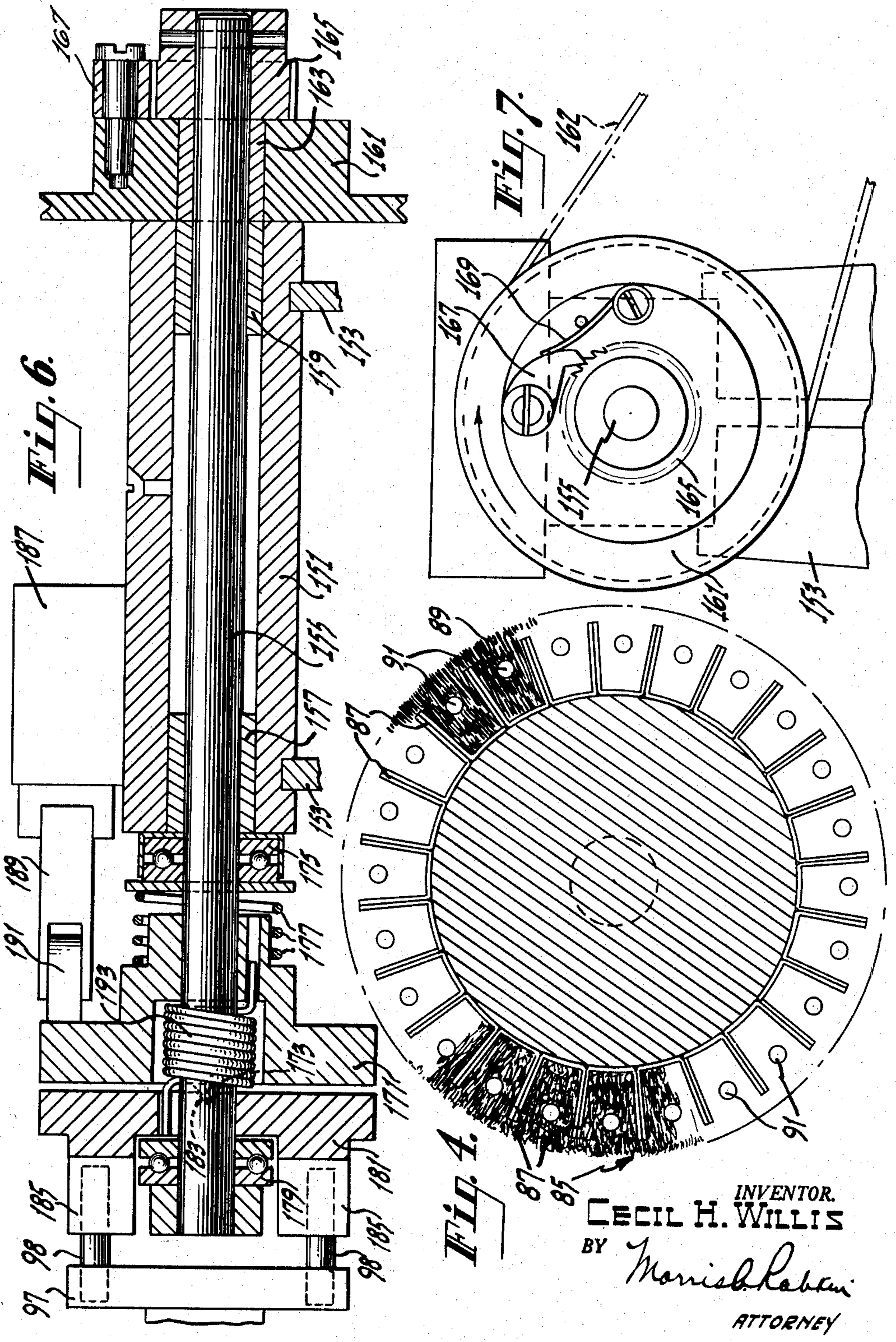
Figure 4 is a sectional view of the soldering roller.
Figure 6 is a sectional view of the driving mechanism for the solder roller.
Figure 7 is an end view of the mechanism of Figure 6.

Referring to Figures 6 and 7 the control mechanism for the soldering assembly drive will now be described. A member 151 having a cylindrical aperture is fixed to the machine housing 11 by means of support members 153. A shaft 155 is rotatably supported within the member 151 by means of bearings 157 and 159. A pulley 161 is rotatably mounted on the shaft 155 at one end of the member 151 by means of a bearing 163. The pulley 161 is coupled to the motor pulley 49 by a belt 162 to drive the solder assembly control mechanism. A ratchet wheel 165 is rigidly fixed to the end of the shaft 155 adjacent the pulley 161. A pawl 167 is mounted on the pulley 161 and is held in engagement with the ratchet wheel 165 by means of a spring 169. The above-described arrangement is provided so that when the pulley is driven in one direction, indicated by the arrow in Figure 6, it will drive the shaft 155 in the same direction through the ratchet and the pawl. This arrangement, however, will permit the shaft to be driven at a faster rate than the pulley by means of an outside source. The purpose of this arrangement will become apparent.

A coupling member 171 is fixed to the end of the shaft 155 opposite from the pulley 161 in such a manner that it will rotate with the shaft but will be permitted to move axially in relation to the shaft. This member 171 is provided with a V-shaped ridge 173 on a surface which is perpendicular to its axis of rotation. This ridge 173 is discontinuous and is aligned on a line passing through the axis of rotation. A thrust bearing 175 is mounted concentrically with the shaft 155 and bears against the end of the member 151 which is opposite from the pulley 161. A helical compression spring 177 is disposed between the coupling member 171 and the thrust bearing 175 bearing against appropriate surfaces of these members. The purpose of this spring will become apparent.

A thrust bearing 179 is rigidly fixed to the end of the shaft 155 opposite from the pulley 161. A coupling member 181 is rotatably mounted on the shaft 155 and bears against the rotatable portion of the thrust bearing 179. This member 181 is provided with a V-shaped groove 183 on a surface which is perpendicular to its axis of rotation. This groove 183 intersects the axis of rotation of the coupling member 181. This groove is disposed to receive the V-shaped ridge 173 of the coupling member 171 and by this means the coupling member 181 is driven through the coupling member 171. This member 181 is further provided with a pair of slots 185 disposed at the side of the member 181 opposite from the groove 183 and aligned in a plane passing through the axis of rotation. These slots 185 are adapted to receive the crank pins 98 carried by the coupling member 97 which is directly coupled to the roller 85 of the soldering assembly 81. By this means the above described control mechanism is coupled to the soldering assembly 81.

A switch 187 is mounted on the member 151 and is adapted to be actuated by a plunger 189 extending from the switch housing and carrying a follower roller 191 at its free end. This roller bears against an annular surface of the coupling member 171 which is perpendicular to its axis of rotation and which is opposite the face of this member carrying the ridge 173. The switch 187 is connected into a control circuit of the motor 39 and is normally positioned to permit energization of the motor. In the event that the coupling member 181 should be locked, due for example to the fact that the solder in the tank 83 is not completely liquified, when the motor 51 attempts to drive the solder roller 85 by means of the above-described mechanism, the rotation of the coupling member 171 will cause the V ridge 173 to slip out of the V groove 183. Since the coupling member 181 is axially fixed due to its engagement with the thrust bearing 179, the coupling member 171 will move away from the coupling member 181 to actuate the switch 187 and stop the drive motor 39. This movement of the coupling member 171 compresses the spring 177.

A torsion spring 193 is disposed over the shaft 155 within a recess provided in the coupling member 171 and is coupled between the coupling members 171 and 181. When the V ridge and groove are disengaged as above described, the rotation of the mechanism prior to the time the drive motor is cut out causes a winding up of this torsion spring. When the cause for the locking of the coupling member 181 has been removed, this spring 193 will tend to unwind bringing the coupling members 171 and 181 back to their original rotational positions permitting the ridge and groove again to engage hence setting up the motor control circuit for the operation of the apparatus.

In overall operation, when the rotary carrier 13 is in the up position, it will not engage the fluxing 61, soldering 81 or cleaning 101 assemblies but will be driven by the motor 51. The cleaning assembly and the soldering assembly will also be driven by the motor 51. It is desirable to keep the solder roller 85 rotating in the molten solder at times when the apparatus is not being used, at short intervals between runs for example, in order to keep the solder agitated and to prevent solidification of the solder on the exposed portion of the roller 85. It is partially for this reason that the control mechanism for the solder assembly 81 is provided.

In order to avoid the necessity of providing identical peripheral velocities for the rotary carrier 13 and the solder roller 85, the ratchet drive arrangement of the control mechanism is provided. When the rotary carrier 13 is in the down position, the solder roller 85 is driven by the rotary carrier 13 due to the frictional engagement between them. The rotational velocity of the solder roller, when driven by the rotary carrier 13, is greater than the rotational velocity of the control drive mechanism 99. Therefore the shaft 155 is rotated faster than the pulley 161 and the speed differential is compensated for in the ratchet and pawl arrangement 165 and 167.

The roller 65 of the fluxing assembly 61 is driven due to its frictional engagement with the rotary carrier 13. The rotary brush 105 of the cleaning assembly 101 is driven through the gear and pulley already described by the motor 51. This is necessary so that differential peripheral velocities may be provided between the rotary carrier 13 and the rotary brush 105 to accomplish an abrasive cleaning action.

In either the up or down positions of the rotary carrier, as this carrier is rotated, the movable clamps 29 engage the cam 43 causing these clamps to release a circuit board that may be clamped to the rotary carrier and permit a new board to be placed thereon either manually or by automatic means. When a clamp 29 passes over the cam 43, it automatically moves toward its mating fixed clamp 25 to lock the circuit board in place. The circuit board is then carried successively past the fluxing, soldering and cleaning assemblies.

What is claimed is:

1. Apparatus for applying molten metal from a body of molten metal to a sheet having exposed metal on one surface thereof, said apparatus comprising a roller having a resilient, porous surface adapted to retain said molten metal, a rotatable member comprising two curved peripheral surfaces spaced in accordance with the width of said sheet, means for securing said sheet to said curved surfaces whereby said sheet is imparted with a curvature, and means for bringing said curved surface of said sheet having exposed metal into contact with said roller whereby molten metal is transferred to said sheet.

2. Apparatus for applying molten metal to a sheet having exposed metal on one surface thereof, said apparatus comprising a roller having a resilient surface adapted to be impregnated with molten metal, a body of molten metal substantially surrounding said roller, a rotatable wheel member having a curved peripheral rim supporting surface, means for securing said sheet to said surface, and means for bringing said curved peripheral surface into rolling engagement with said roller whereby molten metal is presented for transfer to said metal on said surface of said sheet.

3. Apparatus for applying molten metal to a sheet having exposed metal on one surface thereof, said apparatus comprising a roller having a resilient porous surface adapted to retain molten metal, a tank containing molten metal, said roller being rotatably mounted in said tank and being substantially submerged in said molten metal, a rotatable wheel member having a rim supporting surface, means for securing a plurality of said sheets to said rim surface, and means for bringing said rotatable member into rolling engagement with said roller whereby molten metal is presented for transfer to said metal on said surface of said sheets.

4. Apparatus for applying molten metal to a sheet having exposed metal on one surface thereof, said apparatus comprising a roller having surface pockets covered by a fine wire mesh to form a resilient surface adapted to be impregnated with molten metal, a tank containing molten metal, said roller being rotatably mounted in said tank and being substantially submerged in said molten metal, a rotatable member comprising a wheel presenting a peripheral supporting surface, clamp means comprising a movable clamp and a fixed clamp member for securing a plurality of said sheets to said supporting surface, and means for bringing said supporting surface of said rotatable member into rolling engagement with said roller, said roller being driven by said rotatable member whereby molten metal is presented for transfer from said wire mesh surface to said metal on said surface of said sheet.

5. Apparatus for applying molten metal to a sheet having exposed metal on one surface thereof comprising a rotatable support means comprising a wheel having a curved peripheral surface for supporting a plurality of said sheets, means for attaching said sheets to said peripheral surface of said support means whereby said sheets take on the curvature of said peripheral surface, a roller having a resilient, permeable surface, means for impregnating said surface with molten metal, and means for bringing said sheets attached to said rotatable support means into rolling engagement with said impregnated surface of said roller whereby molten metal is transferred from said impregnated surface to said exposed metal on said surface of said sheet.

6. Apparatus for applying molten metal to a sheet having exposed metal on one surface thereof comprising a rotary support means comprising a pair of disc members having a peripheral surface for supporting a plurality of said sheets, means for attaching said sheets to said peripheral surface of said support means, a first roller having an absorbent surface, means for impregnating said absorbent surface with a liquid flux, a second roller having a resilient, permeable surface adapted to retain molten metal, means for impregnating said surface with molten metal, and means for bringing the peripheral surface of said rotary support means into rolling engagement with said rollers whereby liquid flux and molten metal are transferred from said rollers to said exposed metal on said surfaces of said sheets.

7. In apparatus for applying molten metal to a sheet having exposed metal on one surface thereof, a rotatable wheel member having a rim supporting peripheral surface of which all the points are equidistant from its axis of rotation, means for securing a plurality of said sheets to said peripheral surface, a roller having an absorbent flux impregnated surface in rolling engagement with said rotatable member, a roller having a resilient porous metal impregnated surface in rolling engagement with said rotatable member, a roller having an absorbent abrasive surface in engagement with said rotatable member, and driving means for said rotatable member and said roller having an absorbent abrasive surface.

8. In apparatus for applying molten metal to a sheet having exposed metal on one surface thereof, a rotatable member comprising a wheel having a peripheral surface all the points of which are equidistant from its axis of rotation, a plurality of spaced pairs of clamping means for securing a plurality of said sheets to said surface, a roller having an absorbent flux impregnated surface in rolling engagement with said rotatable member, a roller having an absorbent metal impregnated mesh surface in rolling engagement with said rotatable member, a roller having an absorbent abrasive surface in engagement with said rotatable member, driving means for said rotatable member and said roller having an absorbent abrasive surface, and means for selectively moving said rotatable member out of engagement with said rollers.

9. Apparatus for applying molten metal to a sheet having exposed metal on one surface thereof comprising a rotary carrier for supporting a plurality of said sheets, said carrier comprising a wheel mounted for rotation about a horizontal axis, a container for liquid flux disposed adjacent said rotary carrier, a roller having an absorbent surface mounted in said container and disposed in rolling engagement with said rotary carrier, a tank for molten metal mounted adjacent said rotary carrier, a roller having a fine wire mesh molten metal retaining surface mounted in said last named container and disposed in rolling engagement with said rotary carrier, a container for liquid solvent mounted adjacent said rotary carrier, a rotary member having an abrasive surface mounted in said last named container and disposed in engagement with said rotary member, and means for selectively moving said rotary carrier out of engagement with said rollers and said rotary member.

10. Apparatus for applying molten metal to a sheet having exposed metal on one surface thereof comprising a rotary carrier for a plurality of said sheets, said carrier comprising a wheel mounted for rotation about a horizontal axis, a container for liquid flux disposed adjacent said rotary carrier, a roller having an absorbent surface mounted in said container and disposed in rolling engagement with said rotary carrier, a tank for molten metal mounted adjacent said rotary carrier, a roller having a resilient, porous molten metal retaining surface mounted in said last named container and disposed in rolling engagement with said rotary carrier, a container for liquid solvent mounted adjacent said rotary carrier, a rotary member having an abrasive surface mounted in said last named container and disposed in engagement with said rotary member, means for selectively moving said rotary carrier out of engagement with said rollers and said rotary member, means for driving said rotary carrier, said roller having a molten metal retaining surface being normally driven by said rotary carrier, and auxiliary drive means for said last named roller, said auxiliary drive means being inoperative when said last named roller is driven by said rotary carrier.

11. Apparatus for applying molten metal to a sheet having exposed metal on one surface thereof comprising a rotary carrier for supporting a plurality of said sheets, said carrier comprising a wheel and a plurality of spaced pairs of clamping means attached thereon, said clamping means being spaced to clamp the ends of said sheets to the surface of said wheel, said carrier being mounted for rotation about a horizontal axis, a container for liquid flux disposed adjacent said rotary carrier, a roller having an absorbent surface mounted in said container and disposed in rolling engagement with said rotary carrier, a tank for molten metal mounted adjacent said rotary carrier, a roller having a resilient, permeable molten metal retaining surface mounted in said last named container and disposed in rolling engagement with said rotary carrier, a container for liquid solvent mounted adjacent said rotary carrier, a rotary member having an abrasive surface mounted in said last named container and disposed in engagement with said rotary member, means for selectively moving said rotary carrier out of engagement with said rollers and said rotary member, means for driving said rotary carrier, auxiliary drive means for said roller having a molten metal retaining surface, means for disengaging said auxiliary drive means when said last named roller is locked against rotation, and means responsive to said disengagement for stopping the rotary carrier drive means.

12. In apparatus for soldering printed circuits which comprise a sheet having integral conductive strips on one surface thereof and components having leads extending through said sheet and engaging said conductive strips, a rotary carrier for said printed circuits, said carrier comprising a pair of disc members spaced in accordance with the width of said printed circuits, means associated with each of said disc members for clamping successive printed circuits to the periphery of said rotary carrier said means comprising a movable clamp and a fixed clamp member, a container for liquid flux, a roller having an absorbent surface mounted in said container and disposed in rolling engagement with the periphery of said rotary carrier, a container for molten solder, a roller having a resilient wire mesh surface mounted in said last named container and disposed in rolling engagement with the periphery of said rotary carrier, a container for a liquid cleaning solvent, a rotary brush mounted in said container and disposed in engagement with the periphery of said rotary carrier, and means for selectively raising said rotary carrier whereby its peripheral surface is freed from engagement with said fluxing roller, said soldering roller and said rotary brush.

13. In apparatus for soldering printed circuits which comprise a sheet having integral conductive strips on one surface thereof and components having leads extending through said sheet and engaging said conductive strips, a rotary carrier for said printed circuits, said carrier comprising a pair of disc members spaced in accordance with the width of said printed circuits, means associated with each of said disc members for clamping successive printed circuits to the periphery of said rotary carrier whereby said printed circuits conform to the curved surface of said carrier, said means comprising a plurality of pairs of quick opening clamps, a container for liquid flux, a roller having an absorbent surface mounted in said container and disposed in rolling engagement with the periphery of said rotary carrier, a container for molten solder, a roller having a resilient wire mesh surface mounted in said last named container and disposed adjacent to and in rolling engagement with the periphery of said rotary carrier, a container for a liquid cleaning solvent, a rotary brush mounted in said container and disposed in engagement with the periphery of said rotary carrier, means for selectively raising said rotary carrier whereby its peripheral surface is feed from engagement with said fluxing roller, said soldering roller and said rotary brush, drive means for said rotary carrier and said soldering roller, and means responsive to the locking of said last named roller for shutting down said drive means.

14. In apparatus for applying molten metal to a sheet having exposed metal on one surface thereof, said apparatus comprising a rotary disc conveyor having a curved peripheral rim supporting surface, means for driving said conveyor, means for securing a plurality of sheets to said peripheral surface, a container for molten metal disposed adjacent said conveyor, a roller having radially separated surface pockets covered by a resilient wire mesh, said roller being mounted in said container to be substantially submerged in molten metal, means for moving said conveyor into engagement with the exposed surface of said roller, means for driving said roller to provide a peripheral velocity smaller than the peripheral velocity of said conveyor, and means permitting overtravel of the roller with respect to its drive means whereby said roller is driven through frictional engagement with said conveyor when the roller and the conveyor are engaged.

References Cited in the file of this patent

UNITED STATES PATENTS

| | | |
|---|---|---|
| 330,318 | Green et al. | Nov. 10, 1885 |
| 1,082,279 | Low | Dec. 23, 1913 |
| 1,365,291 | Stephens et al. | Jan. 11, 1921 |
| 1,559,195 | Stein | Oct. 27, 1925 |
| 1,580,671 | Nichols | Apr. 13, 1926 |
| 1,804,641 | Pemberton-Billing | May 12, 1931 |
| 2,367,856 | Ettl | Jan. 23, 1945 |
| 2,457,070 | Scharwath | Dec. 21, 1948 |
| 2,549,868 | Vickery | Apr. 14, 1951 |
| 2,740,193 | Pessel | Apr. 3, 1956 |
| 2,770,875 | Zimmerman | Nov. 20, 1956 |

UNITED STATES PATENT OFFICE

CERTIFICATE OF CORRECTION

May 19, 1959

Patent No. 2,887,078

Cecil H. Willis

It is hereby certified that error appears in the printed specification of the above numbered patent requiring correction and that the said Letters Patent should read as corrected below.

Column 9, line 35, after "carrier" insert a comma; column 10, line 17, for "feed" read -- freed --.

Signed and sealed this 19th day of January 1960.

(SEAL)

Attest:

KARL H. AXLINE

Attesting Officer

ROBERT C. WATSON

Commissioner of Patent